United States Patent
Seetharaman et al.

(10) Patent No.: US 8,015,042 B2
(45) Date of Patent: Sep. 6, 2011

(54) METHODS FOR LONG-RANGE CONTACT CENTER STAFF PLANNING UTILIZING DISCRETE EVENT SIMULATION

(75) Inventors: Krithika Seetharaman, Sunnyvale, CA (US); Jason Fama, Foster City, CA (US); Edward Hamilton, San Jose, CA (US)

(73) Assignee: Verint Americas Inc., Melville, NY (US)

( * ) Notice: Subject to any disclaimer, the term of this patent is extended or adjusted under 35 U.S.C. 154(b) by 1087 days.

(21) Appl. No.: 11/529,132

(22) Filed: Sep. 28, 2006

(65) Prior Publication Data
US 2007/0061183 A1 Mar. 15, 2007

Related U.S. Application Data

(63) Continuation-in-part of application No. 09/899,895, filed on Jul. 5, 2001, now Pat. No. 7,478,051.

(60) Provisional application No. 60/281,052, filed on Apr. 2, 2001.

(51) Int. Cl.
*G06Q 10/00* (2006.01)
(52) U.S. Cl. .................................. 705/7.12
(58) Field of Classification Search .................. 705/7.12
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,700,295 A * | 10/1987 | Katsof et al. | 705/10 |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,111,391 A * | 5/1992 | Fields et al. | 705/9 |
| 5,117,225 A | 5/1992 | Wang | |
| 5,185,780 A * | 2/1993 | Leggett | 379/265.08 |
| 5,210,789 A | 5/1993 | Jeffus et al. | |
| 5,239,460 A | 8/1993 | LaRoche | |

(Continued)

FOREIGN PATENT DOCUMENTS

EP 0453128 A2 10/1991

(Continued)

OTHER PUBLICATIONS

Klungle, Roger, The Role of Simulation in Call Center Management: AAA Michigan in the Proceedings of the 1997 MUSG Conference, 1997.*

(Continued)

*Primary Examiner* — Scott L Jarrett

(57) ABSTRACT

Systems and methods for long-range simulation are provided. A representative method includes: defining at least one resource description, wherein a resource description comprises a group of resources that have similar characteristics, and wherein defining comprises specifying the characteristics, including at least one capability and at least one performance measure; defining at least one work load; and specifying at least one criteria to be satisfied by a long-range staffing plan; and calculating an effect of applying the at least one resource description to the at least one work load using discrete event based simulation, wherein the calculated effect includes at least one performance measure for the at least one work load.

10 Claims, 5 Drawing Sheets

U.S. PATENT DOCUMENTS

| | | | |
|---|---|---|---|
| 5,241,625 A | 8/1993 | Epard et al. | |
| 5,267,865 A | 12/1993 | Lee et al. | |
| 5,299,260 A | 3/1994 | Shaio | |
| 5,311,422 A | 5/1994 | Loftin et al. | |
| 5,315,711 A | 5/1994 | Barone et al. | |
| 5,317,628 A | 5/1994 | Misholi et al. | |
| 5,325,292 A * | 6/1994 | Crockett | 705/7.18 |
| 5,347,306 A | 9/1994 | Nitta | |
| 5,388,252 A | 2/1995 | Dreste et al. | |
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,485,569 A | 1/1996 | Goldman et al. | |
| 5,491,780 A | 2/1996 | Fyles et al. | |
| 5,499,291 A | 3/1996 | Kepley | |
| 5,500,795 A * | 3/1996 | Powers et al. | 705/11 |
| 5,519,773 A * | 5/1996 | Dumas et al. | 379/265.05 |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,617,342 A * | 4/1997 | Elazouni | 703/6 |
| 5,619,183 A | 4/1997 | Ziegra et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,828,747 A * | 10/1998 | Fisher et al. | 379/265.12 |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,903,641 A * | 5/1999 | Tonisson | 379/265.12 |
| 5,907,680 A | 5/1999 | Nielsen | |
| 5,911,134 A * | 6/1999 | Castonguay et al. | 705/7.12 |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,044,355 A * | 3/2000 | Crockett et al. | 705/8 |
| 6,052,460 A * | 4/2000 | Fisher et al. | 379/265.12 |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,088,441 A * | 7/2000 | Flockhart et al. | 379/265.12 |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,205,412 B1 * | 3/2001 | Barskiy et al. | 703/13 |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Purnam et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,459,787 B2 | 10/2002 | McIlwaine et al. | |
| 6,459,946 B1 * | 10/2002 | Villanova et al. | 700/111 |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,601 B1 * | 3/2003 | Flockhart et al. | 379/266.01 |
| 6,535,909 B1 | 3/2003 | Rust | |
| 6,542,602 B1 | 4/2003 | Elazer | |
| 6,546,405 B2 | 4/2003 | Gupta et al. | |
| 6,560,328 B1 | 5/2003 | Bondarenko et al. | |
| 6,574,605 B1 * | 6/2003 | Sanders et al. | 705/8 |
| 6,583,806 B2 | 6/2003 | Ludwig et al. | |
| 6,587,831 B1 * | 7/2003 | O'Brien | 705/7.16 |
| 6,606,657 B1 | 8/2003 | Zilberstein et al. | |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIlwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,959,078 B1 | 10/2005 | Eilbacher et al. | |
| 6,965,886 B2 | 11/2005 | Govrin et al. | |
| 6,970,829 B1 * | 11/2005 | Leamon | 705/9 |
| 7,050,567 B1 * | 5/2006 | Jensen | 379/266.01 |
| 7,133,520 B1 * | 11/2006 | Doyle et al. | 379/265.01 |
| 7,200,219 B1 * | 4/2007 | Edwards et al. | 379/265.01 |
| 7,478,051 B2 * | 1/2009 | Nourbakhsh et al. | 705/9 |
| 7,702,411 B2 * | 4/2010 | Bagchi et al. | 700/100 |
| 7,734,783 B1 * | 6/2010 | Bourke et al. | 709/226 |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052770 A1 * | 5/2002 | Podrazhansky | 705/7 |
| 2002/0052948 A1 | 5/2002 | Baudu et al. | |

| | | | |
|---|---|---|---|
| 2002/0065911 | A1 | 5/2002 | Von Klopp et al. |
| 2002/0065912 | A1 | 5/2002 | Catchpole et al. |
| 2002/0123983 | A1* | 9/2002 | Riley et al. .................. 707/1 |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0055883 | A1 | 3/2003 | Wiles |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0165717 | A1 | 8/2004 | McIlwaine et al. |
| 2005/0135607 | A1 | 6/2005 | Lee et al. |

FOREIGN PATENT DOCUMENTS

| | | |
|---|---|---|
| EP | 0773687 A2 | 5/1997 |
| EP | 0989720 | 3/2000 |
| EP | 1271379 A1 | 1/2003 |
| GB | 2369263 | 5/2002 |
| WO | WO 98/43380 | 11/1998 |
| WO | WO 00/16207 | 3/2000 |

OTHER PUBLICATIONS

Reynolds, Penny, Automating for Better Workforce Management Call Center Solutions, Mar. 1999, vol. 17, No. 9.*
Melnick, Edward L. et al., Call Center Financial Services 1999, Chapter 18: Call Centers in Financial Sercices: Strategies, Technologies and Operations, Pinedo, Michael et al.*
Saltzman, Robert M., A Call Center Uses Simulation to Drive Strategic Change Interfaces, vol. 31, No. 3, May/Jun. 2001.*
Anton, Jon et al., Call Center Performance Enhancement Using Simulation and Modeing Prudue University Press, 1999.*
Hughes, Coulette, Four steps for accurate call-center staffing HRMagazine, vol. 40 No. 4, Apr. 1995.*
Thompson, Gary M., Labor Scheduling Part 2: Knowing How Many On-duty Employees to Schedule Cornell Hotel and Restaurant Administration Quarterly, vol. 39, No. 6, Dec. 1998.*
Thompson, Gary M., Labor Scheduling Part 3: Developing a Workfoce Schedule Cornell Hotel and Restaurant Administratino Quarterly, vol. 40, No. 1, Feb. 1999.*
Brigandi, Anthony John, or applications in call center operations Polytechnic University, 1995.*
PrimeTime F&S Versino 1.3 User's Guide Blue Pumpkin Software Inc., 1997, 1998.*
Klungle, Roger, The Role of Simulation in Call Center Management, AAA Michigan in the Proceedings of the 1997 MUSG Conference, 1997.*
Anton, Jon et al., Call Center Performance Enhancement Using Simulation and Modeling Ichor Business Books, Purdue University Press, 1999.*
Bapat, Vivek et al., Using Simulation in Call Centers Proceedings of the 1998 Winter Simulation Conference, 1998.*
Hall,Bill and Anton, Jon, Optimize your call center through simulation Call Center Solutions, vol. 17, No. 3, Sep. 1998.*
Saltzmann, Robert M. et al., A Call Center Uses Simulation to Drive Strategic Change Interfaces, May/Jun. 2001, vol. 31, No. 3.*
Mehrotra, Vijay et al., Simulation: The Best Way to Design Your Call Center Telemarketing & Call Center Solutions, vol. 16 No. 5, Nov. 1997.*
Rockwell SSD announces call center simulator Telemarketing & Call Center Solutions, vol. 15, No. 9, Mar. 1997.*
"Customer Spotlight: Navistar International," Web pae, unverified print date of Apr. 1, 2002.
"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"Price WaterouseCoopers Case Study" The Business Challenge, Web page, unverified cover date of 2000.
Abstract, net.working: "An Online Webliography," Technical Training pp. 4-5 (Nov.-Dec. 1998).
Adams et al., "Our Turn-of-the-Century Trend Watch" Technical Training pp. 46-47 (Nov./Dec. 1998).
Barron, "The Road to Performance: Three Vignettes," Technical Skills and Training pp. 12-14 (Jan. 1997).
Bauer, "Technology Tools: Just-in-Time Desktop Training is Quick, Easy, and Affordable," Technical Training pp. 8-11 (May/Jun. 1998).
Beck et al., "Applications of AI in Education," AMC Crossroads vol. 1: 1-13 (Fall 1996) Web page, unverified print date of Apr. 12, 2002.
Benson and Cheney, "Best Practices in Training Delivery," Technical Training pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the $8^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," ACM, unknown page numbers (1997).
Coffey, "Are Performance Objectives Really Necessary?" Technical Skills and Training pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," Computerworld 32(48):4344 (Nov. 30, 1998).
Cross: "Sun Microsystems—the SunTAN Story," Internet Time Group 8 (©2001).
Cybulski and Linden, "Teaching Systems Analysis and Design Using Multimedia and Patterns," unknown date, unknown source.
De Bra et al., "Adaptive Hypermedia: From Systems to Framework," ACM (2000).
De Bra, "Adaptive Educational Hypermedia on the Web," Communications ACM 45(5):60-61 (May 2002).
Dennis and Gruner, "Computer Managed Instruction at Arthur Andersen & Company: A Status Report," Educational Technical pp. 7-16 (Mar. 1992).
Diessel et al., "Individualized Course Generation: A Marriage Between CAL and ICAL," Computers Educational 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," Personal Learning Network pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
E-Learning the future of learning, THINQ Limited, London, Version 1.0 (2000).
Eline, "A Trainer's Guide to Skill Building," Technical Training pp. 34-41 (Sep./Oct. 1998).
Eline, "Case Study: Briding the Gap in Canada's IT Skills," Technical Skills and Training pp. 23-25 (Jul. 1997).
Eline "Case Study: IBT's Place in the Sun," Technical Training pp. 12-17 (Aug./Sep. 1997).
Fritz, "CB templates for productivity: Authoring system templates for trainers," Emedia Professional 10(8):6678 (Aug. 1997).

Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1] , authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You on (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. *Déjà vu—Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, Sci-Tech, Dec. 4, 1997.
*Interactive TV Overview TimeLine*, Interactive TV News.
*Interactive TV Wars Heat Up*, Industry Standard.
Needle. *Will the Net Kill Network TV?* PC World Online, Mar. 10, 1999.

Kane. *AOL-Tivo: You've Got Interactive TV*, ZDNN, Aug. 17, 1999.
Kay. *E-Mail in Your Kitchen*, PC World Online, Mar. 28, 1996.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.
Tumay, K., "Business Process Simulation", Proceedings of the 1996 Winter Simulation Conference, Dec. 8-11, 1996, pp. 93-98.
Kampstra, P., "Supposrting Work Force Management in Customer Contact Centers", Master's Thesis, Jun. 16, 2005 (retrieved from URL http://www.few.vu.nl/stagebureau/stage.stageverslagen/stageverslag-kampstra.pdf).

* cited by examiner

Fig. 2A

Big Corp Feb. 2001 - Jan 2002

File  Edit  View  Export  Help

- Views
  - Pre-defined Views
    - Everything
    - Forecasting
    - Hiring
    - Budgeting
  - Custom Views
- Queues
  - RegEntry
  - Tier2 Case
  - Top Tier
  - Create new queue
- Agent Profiles
- Wizards
  - Configuration/Setup
    - Create cost model
    - Calculate accurate shrink
    - New agent profile
    - New queue
  - Reduce costs
  - Identify downside
  - Anticipate future events
- Events

202

RegEntry: Voice, service goal=80% in 60 seconds

| | Feb | Mar | Apr | May | Jun | Jul | Aug |
|---|---|---|---|---|---|---|---|
| Contact volume | 380000 | 385000 | 390000 | 385000 | 410000 | 415000 | 410000 |
| % volume | | | | | | | |
| AHT | 230 | 230 | 230 | 230 | 230 | 230 | 230 |
| Actual service | 86 | 85 | 79 | 93 | 79 | 80 | 94 |
| Required hours | 29556 | 29929 | 30315 | 29929 | 31819 | 32204 | 31819 |
| Capacity hours | 29765 | 30102 | 30264 | 30562 | 31765 | 32189 | 32522 |

Tier2 Care: Voice, service goal=90% in 45 seconds

| | Feb | Mar | Apr | May | Jun | Jul | Aug |
|---|---|---|---|---|---|---|---|
| Contact volume | 30000 | 31090 | 32000 | 31000 | 33000 | 34000 | 34000 |
| % volume | 8 | 8 | 8 | 8 | 8 | 9 | 9 |
| AHT | 220 | 220 | 220 | 220 | 220 | 220 | 220 |
| Actual service | 88 | 90 | 85 | 95 | 85 | 85 | 95 |
| Required hours | 2978 | 3059 | 3131 | 3059 | 3221 | 3295 | 3295 |

204

Entry level FT (RG); Shrinkage: 8.5%

| | Feb | Mar | Apr | May | Jun | Jul | Aug |
|---|---|---|---|---|---|---|---|
| Hires | 14 | 12 | 12 | 15 | 17 | 15 | 15 |
| In training | 0 | 0 | 0 | 0 | 0 | 0 | 0 |
| Xfer out | 0 | 4 | 0 | 0 | 5 | 4 | 6 |
| Attrition | 9 | 9 | 9 | 9 | 9 | 9 | 9 |
| Head count | 185 | 184 | 187 | 193 | 196 | 198 | 198 |
| Occupancy | 82 | 82 | 83 | 81 | 83 | 83 | 81 |

T2 full time (T2, RG); Shrinkage: 7.4% (Continued on Fig. 2B...)

| | Feb | Mar | Apr | May | Jun | Jul | Aug |
|---|---|---|---|---|---|---|---|
| Hires | 0 | 0 | 0 | 0 | 0 | 0 | 0 |

T2 full time (T2, RG); Shrinkage: 7.4% (Continued from Fig. 2A)

| | Feb | Mar | Apr | May | Jun | Jul | Aug |
|---|---|---|---|---|---|---|---|
| In training | 0 | 0 | 0 | 0 | 0 | 0 | 0 |
| Xfer in | 0 | 4 | 0 | 0 | 5 | 4 | 6 |
| Xfer out | 0 | 0 | 0 | 0 | 0 | 0 | 0 |
| Attrition | 0 | 2 | 2 | 2 | 2 | 2 | 2 |
| Head count... | 25 | 27 | 25 | 23 | 26 | 28 | 32 |
| Occupancy | 100 | 99 | 100 | 100 | 100 | 100 | 99 |

Totals

| | Feb | Mar | Apr | May | Jun | Jul | Aug |
|---|---|---|---|---|---|---|---|
| Contact volume | 417000 | 424000 | 430000 | 423000 | 450000 | 456000 | 450000 |
| Hires | 14 | 12 | 12 | 15 | 17 | 15 | 15 |
| Head count | 219 | 222 | 223 | 228 | 233 | 236 | 240 |
| Staff hours | 35040 | 35520 | 35680 | 36480 | 37280 | 37760 | 38400 |
| Total cost | 414,679 | 421,192 | 422,681 | 431,892 | 441,475 | 477,150 | 455,338 |
| Cumulative cost | 414,679 | 835,871 | 1,258,5... | 1,690,4... | 2,131,9... | 2,579,0... | 3,034,4... |

CONTINUED FROM FIG. 2A

FIG. 2B

METHODS FOR LONG-RANGE CONTACT CENTER STAFF PLANNING UTILIZING DISCRETE EVENT SIMULATION

RELATED APPLICATIONS

This patent application is a Continuation-in-Part application that claims the benefit of and priority to U.S. patent application Ser. No. 09/899,895, entitled Method and Apparatus for Long-Range Planning, filed on Jul. 5, 2001 now U.S. Pat. No. 7,478,051, which claims the benefit of and priority to U.S. Provisional Patent Application Ser. No. 60/281,052, entitled The Long Range Planner Software Product, filed Apr. 2, 2001, both of which are incorporated herein by reference.

TECHNICAL FIELD

The invention relates to predicting the effect of proposed long-range plans on complex systems.

DESCRIPTION OF THE RELATED ART

Managers and administrators of many types of complex systems routinely try to produce long-range plans for the enterprise. An effective long-range plan should predict future conditions, the types of ongoing actions needed to meet those conditions, and the costs and relative effectiveness of the ongoing actions. One objective of an effective long-range plan is to reduce the expenditure of time and money by an enterprise while maximizing efficiency and profit. One example of a complex system is a consulting enterprise that performs many types of work for many types of clients using many types of employees. Significant long-range planning challenges for a consulting enterprise include predicting work loads and types of work loads, and predicting hiring and training needs.

A contact center is a complex system that provides a good example of the requirements for effective long-range planning. A contact center is an organization that responds to incoming contacts from customers of an enterprise. The incoming contacts are via any one of a number of contact media, such as telephone calls, email, fax, web chat, voice over internet protocol, and call backs. An agent is an employee that is trained to respond to various contacts according to both the content and the medium of the contact. Each agent can have a different skill set. For example, one agent may be trained to answer live telephone help inquiries regarding certain products, respond to email regarding certain products, receive telephone purchase orders for certain products, etc. Typically, incoming contacts are assigned to different queues based upon the content and/or medium of the contact. In this regard, contact queues can be divided into at least two types of queues. For example, one type of queue is an immediate queue for contacts that can be abandoned and should be responded to in real-time, such as telephone calls. Another type of queue is a deferred queue for contacts that cannot be abandoned (at least not immediately) and should be responded to within some time period after receipt, such as email or fax. Queues may be defined in any other way, such as by the required level of service on a particular queue, where a common measure of service level is a percentage of calls answered within a defined time period. An agent may be assigned to multiple queues within a time period. A queue typically handles one type of contact requiring a particular skill or skills. The possible number of agent skill sets includes every permutation of combinations of the existing skills in the organization. Each agent has a particular skill set, but the skill sets among different agents may overlap.

Enterprises operating contact centers must schedule agents carefully in order to provide a required level of service on each queue at the lowest overall cost. A poor schedule could leave many calls unanswered, or leave many paid agents idle. Existing scheduling and forecasting tools are designed to create work schedules for the agents currently available. Schedules are typically created for no more than four weeks in advance. Existing scheduling and forecasting tools account for such specifics as a particular agent's vacations, proficiency and availability. The scheduling tools attempt to maximize service level by intelligently scheduling available agents. Existing scheduling tools, however, do not provide guidance for long-range planning. Scheduling tools guide day-to-day staffing decisions given a fixed set of resources, but do not help an administrator intelligently plan future hiring and training decisions. For example, scheduling tools do not allow an administrator to see the effects of scheduling, hiring, and training decisions on queue service levels or costs.

To conduct long-term planning with traditional scheduling tools, users typically create a "virtual week" far in the future, and add artificial agents to a schedule. Scheduling is then performed, while varying parameters to conduct "what-if" studies. This approach is inadequate for accurate long-range planning for several reasons. For example, the period of time available for scheduling is too short to be of use for long-range planning. This is a fundamental inadequacy, in that long-term planning spans several months, rather than the two to four weeks available with current tools. This leads to inaccurate results, in part because seasonal and yearly variations cannot be captured by the tool. A direct result of this temporal mismatch is that long-term hiring plans and training plans cannot be created using the traditional approach to long-term planning. Therefore, traditional scheduling and forecasting approaches at their best are only usable for estimating staff hours required, but are not usable for the creation of hiring and training plans.

Another reason traditional scheduling approaches are inadequate for accurate long-range planning is that they are unnecessarily time-consuming. One of the reasons for this is that traditional tools deal with atomic temporal units ranging from five minutes to fifteen minutes. This is too fine-grained for conducting long-term planning and, as a result, the scheduling engine, which is busy identifying artificial agents' starting and ending shift times with fifteen minute precision, is unnecessarily slow. Another reason is that traditional tools include parameters that are insignificant in the creation of long-term plans, yet the user is forced to specify these parameters and thus waste time while conducting long-term planning. Examples of such parameters include the specific distribution of breaks in a particular shift, unnecessarily precise information regarding an agent's unavailability, proficiency and shift preferences, etc.

Yet another reason traditional scheduling approaches are inadequate for accurate long-range planning is that they provide no scheduling-free solution to the problem of computing performance. In the case of skill-based contact centers, there is no traditional system that can estimate the performance of the contact center based on total headcount numbers without launching into a complete scheduling session, in which agents are scheduled and the resulting schedule's performance is measured. This is time-consuming and inefficient. Also, because the performance that is measured is over a short period, traditional scheduling methods probably generate inaccurate performance measurements of long-range staffing plans.

There are existing long-term forecasting tools which are used to estimate the volume of calls or contacts that will be expected months and years into the future. These are trend analysis tools, in that they enable the user to incorporate prior historical data in the exercise of creating seasonal, monthly, weekly and daily trends. Once these trends have been created, they are applied forward in time based on current contact or call statistics to yield estimates of incoming call volumes for future months over a long term. Although this process can successfully estimate future call volumes, the long term forecasting tool is inadequate for more complete long-term planning for several reasons. One reason is that long-term forecasting provides no estimate of staffing hours required, especially in a skills-based environment. Another reason long-term forecasting is inadequate for more complete long-term planning is that existing long-term forecasting tools provide no estimate of performance (such as service level and queue occupancy) given headcount. Another inadequacy is that existing long-term forecasting has no mechanism for constructing hiring or training plans. Yet another inadequacy is that long-term forecasting has no mechanism to enable the user to assess the impact of making structural changes to the contact center (e.g. splitting a queue or adding a queue).

SUMMARY

Systems and methods for long-range simulation are provided. In this regard, an embodiment of a method comprises: defining at least one resource description, wherein a resource description comprises a group of resources that have similar characteristics, and wherein defining comprises specifying the characteristics, including at least one capability and at least one performance measure; defining at least one work load; and specifying at least one criteria to be satisfied by a long-range staffing plan; and calculating an effect of applying the at least one resource description to the at least one work load using discrete event based simulation, wherein the calculated effect includes at least one performance measure for the at least one work load.

An embodiment of a comprises at least one server comprising at least one storage device; and at least one client processor coupled to the server through a network. The client processor is coupled to a plurality of storage devices, including a storage device that stores instructions that, when executed, cause the at least one client processor to: receive a definition of at least one employee profile, wherein an employee profile comprises a group of employees that have similar characteristics, wherein the characteristics include a skill set and an efficiency percentage; receive a definition of at least one queue, wherein the at least one queue handles a plurality of contacts through a plurality of contact media; receive a specification of at least one criteria to be satisfied by a long-range staffing plan; and calculate an effect of staffing the at least one queue with the at least one employee profile using discrete event based simulation, wherein the calculated effect includes a service level for the at least one queue.

An embodiment of an electromagnetic medium contains executable instructions which, when executed in a processing system, perform a method for generating a proposed long-range staffing plan for a contact center, wherein the method comprises: defining at least one employee profile, wherein an employee profile comprises a group of employees that have the same skills, and wherein defining comprises specifying characteristics, including a skill set and an efficiency percentage; defining at least one queue; specifying at least one criteria to be satisfied by a long-range staffing plan; and calculating an effect of staffing the at least one queue with the at least one employee profile using discrete event based simulation, wherein the calculated effect includes a service level for the at least one queue, and an effective cost per hour.

BRIEF DESCRIPTION OF THE DRAWINGS

FIG. 2A is a user interface screen of an embodiment.

FIG. 2B is a continuation of the illustration of FIG. 2A.

DETAILED DESCRIPTION

A method and apparatus for long-range planning are described. The method and apparatus are applicable to any complex system that allocates various resources to various work loads. One embodiment is a method for generating the effects of proposed long-range plans on a contact center that handles multiple queues and multiple contact media. The method takes as input a variety of information about a proposed long-range plan. The information includes multiple employee (employee and "agent" will be used interchangeably herein) profiles, expected call volumes per queue, average handling times per queue, required hours per queue, and required service levels per queue. Employees can have any combination of skills. For example, employees may be skilled in handling one or more types of queues and/or one or more types of contact media. The method produces a detailed report of the effects of the proposed long-range plan, including "actual" service levels per queue and "actual" capacity hours. The method further produces cost forecasts based on the input information, including an effective cost per hour and projected training costs.

Figure 1:
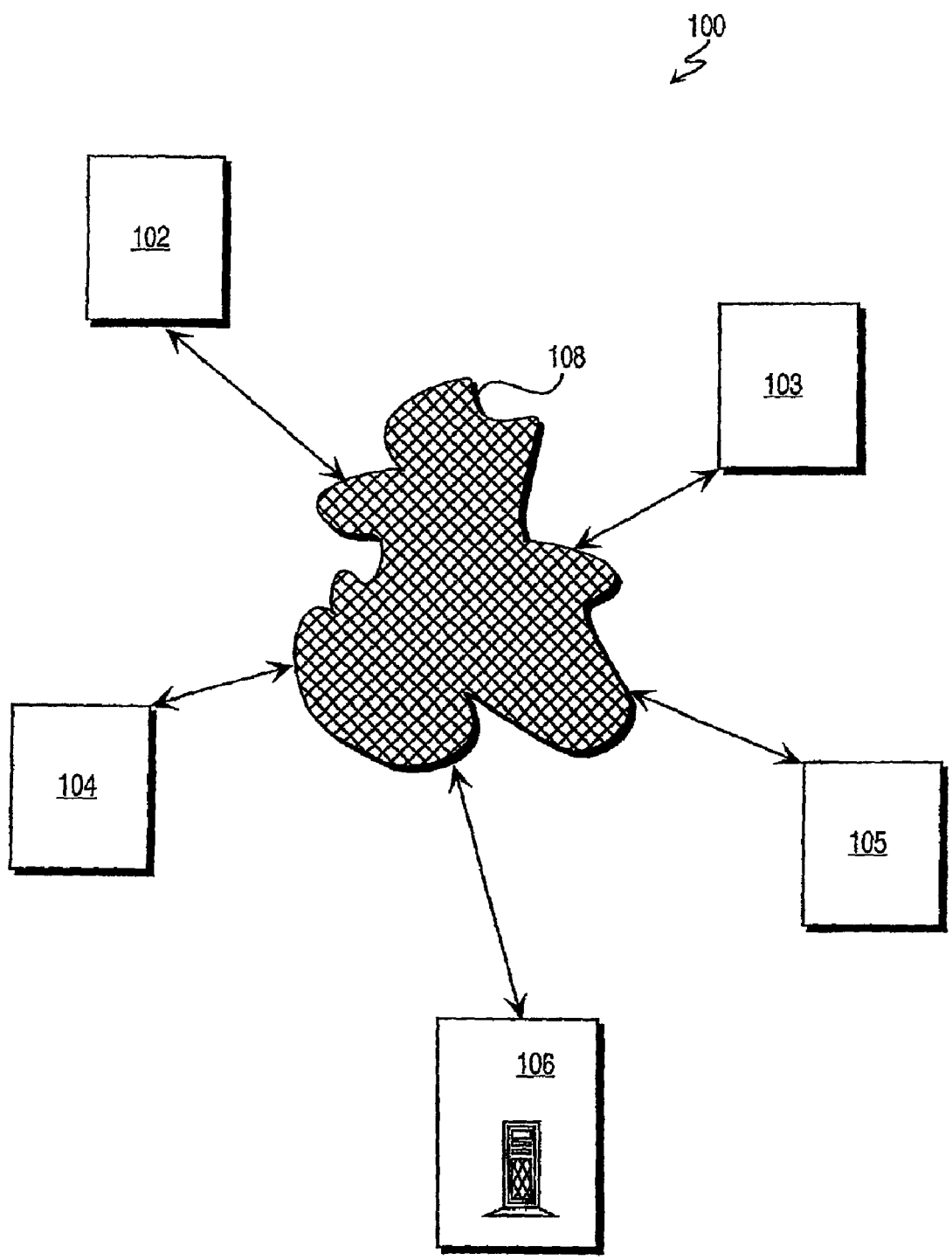
FIG. 1 is a block diagram of an embodiment of a system for multi-contact schedule generation.

FIG. 1 is an embodiment of a system 100 for long-range planning. The system includes multiple client computers 102-105, which are coupled to the server 106 through a network 108. The network 108 can be any network, such as a local area network, a wide area network, or the Internet. The client computers each include one or more processors and one or more storage devices. Each of the client computers also includes a display device, and one or more input devices. The server 106 includes one or more storage devices. All of the storage devices store various data and software programs. In one embodiment, methods for long-range planning are carried out on the system 100 by software instructions executing on one or more of the client computers 102-105. The software instructions may be stored on the server 106 or on any one of the client computers. For example, one embodiment is a hosted application used by a contact center of an enterprise that requires long-range staffing planning for many employees, or agents. The software instructions are stored on the server and accessed through the network by a client computer operated by the enterprise. In other embodiments, the software instructions may be stored and executed on the client computer. Data required for the execution of the software instructions can be entered by a user of the client computer through a specialized user interface. Data required for the execution of the software instructions can also be accessed via the network and can be stored anywhere on the network.

The long-range planning method and apparatus include various functions accessible through a user interface as described below. One of the functions is preliminary long-range plan design, including payroll planning. The hiring strategy and training strategy for a contact center is planned for a coming year, and the impact of decisions on contact center performance and payroll costs are viewed. This requires a temporal horizon of up to 3 years. This process includes creation of a long-range forecast, computation of the required future headcount and planning hiring and training to achieve the best possible headcount subject to payroll constraints.

"What-if" structural and non-structural evaluations are also accessible functions. "What-if" evaluations facilitate the consideration of both major and minor changes to next year's plan, including changing the distribution of agent skills, changing the outsourcing model, altering the training program, etc. "What-if" evaluations allow the impact of possible changes on head count needs, quality of service and cost to be viewed.

Another accessible function allows an administrator to intelligently strategize call center changes, particularly in compensation areas such as hiring plans and training plans. The user enters planned projections, and can view the deviations of a proposed plan from those projections. The user makes changes on portions of the plan based on new information and views the impact of these corrections. There are simple work-flows for making the same change to multiple plans that have temporal intersection with one another.

The user may make a skill-based representation of a strategic plan. In one embodiment, the long-range planner operates in a skills-based setting. Contact statistics such as volume, average handling time (AHT), and service goals are viewed and edited on a queue-by-queue basis. Hiring and training are visualized based on skill set-based groupings of agents. Multi-contact functionality is also available. Each queue can be annotated as a standard phone or chat queue, or alternatively as a deferred queue (e.g., e-mail or fax).

In one embodiment, the temporal granularity of long-range planning is monthly. When creating or modifying a plan, the user defines a period of time, in months, for planning. There is no reason for artificial bounds to be placed on the maximum size of this time period. The long-range planner can be used to view the effects of proposed one year plans, or three to five year plans.

Long-range forecast generation is possible, such as monthly incoming volume forecasts specifiable on a queue-by-queue basis given AHT. Multiple sources of information are generally collected in the creation of a long-range forecast (e.g. marketing input, historical data, and executive goals). Optionally, the user interface facilitates the fusion of data from multiple sources, with clear pointers back to the sources via text explanations. Trend-based forward forecasts, profile acquisition, and raw value acquisition using historical data are available functions.

Variations (e.g. spikes in call volume) are justified by special events such as holidays or catalog drops or marketing product introductions. For such variations, a tool for creating events and clearly labeling the cause of each such event is available.

For headcount planning and need calculation, the user specifies a variety of aspects of planned and unplanned shrinkage and inefficiency (e.g. absenteeism, recurrent training, vacation, etc.). In addition, the user specifies overall work hours of a full-time agent. Based on these values, the service goals and the volume forecast, an estimate of the staffing hours need on a per-queue basis is produced.

Actual staffing hours are calculated based on an attrition specification, a hiring plan specification, a training specification, and skills. The attrition specification allows a separate attrition rate for hires and for live agents.

A training specification can be as simple as the amount of core training time required to take a new hire live. Training plan specification includes estimates of incoming headcount and outgoing headcount. Outgoing headcount refers to individuals leaving a skill group/staff profile to begin training for work in another staff profile. All headcount values can be viewed on a staffing-profile-specific basis. In one embodiment, a staffing profile, or profile, is a group of hypothetical agents that share the same set of skills. A profile could be defined in other ways as necessary, for example, as a group of hypothetical agents that have the same associated costs.

Performance estimates are provided on a queue-by-queue basis by showing the disparity between staffing hours needed and staffing hours achieved as well as the expected service level and profile-by-profile occupancy.

Cost computation and reporting capabilities are provided. Cost estimates are possible using a computation of actual cost per scheduled staff hour. This computation is based upon payroll wage distribution, payroll burden and the proportion of hours paid to hours worked (computed based on specified values of unpaid absenteeism, planned shrinkage, paid absenteeism and holidays). Actual cost per schedule staff hour is computed, as well as burden proportion and work cost (hours paid/hours worked ratio, or "paid/work ratio"). Specificity at the level of each group is allowed so that characteristics such as for example, training due to shrinkage, can vary among groups. A final budget visualization shows these variable costs and allows for inclusion of multiple user-defined rows to contain one-time and miscellaneous costs that are added directly to the computed values. The budget computation allows changes to the budget model mid-year in a single plan. Examples are allowing a planned salary increase in average per-head loaded cost, or a planned training for a product's new version release.

One embodiment of the long-range planner includes an event planner with which a user is able to define an event, with temporal specification. Thereafter, the user specifies the impact of the event on the contact center in terms of contact center statistics, such as volume forecast ramps or AHT spikes, as well as agent statistics such as training, shrinkage, and temporary changes. The user is notified of the event in the long-range plan and is able to conduct cost impact and service level impact studies by moving the event to different months.

As shown in FIGS. 2A and 2B, the main interface 200 of one embodiment consists of sets of grids in a central screen area. Three panes 204, 206, and 208 are positioned in a large column, with a fourth menu pane 202 to the left of the column. The top pane 204 contains a set of grids, one for each queue in the purview of the user's contact center(s). In one embodiment, a queue is defined as a stream of contacts. Through the grouping of various call types into various queues, the user identifies physically or logically separate loads upon the contact center. Each queue grid includes temporally indexed information on the following statistics: contact volume; percentage of volume distribution; average handling time; actual service level expected; required staff hours; and capacity staff hours. In addition, each queue has both a queue type and service goals that are set by the user.

The middle pane 206 contains a set of grids, one for each profile in the purview of the user's contact center(s). A profile is a collection of abstract agents that all share the same set of skills. Profiles are not necessarily unique. Each profile grid includes temporally indexed information on the following statistics: number hired; number in training; number transferred in from other profiles; number transferred out to other profiles; total head count; expected occupancy; and shrinkage rate. In addition, each profile has associated with it a set of skills or queues, an average wage and proficiency, and a breakout of the sources of shrinkage for members of the profile (e.g. unpaid absenteeism, paid shrinkage such as jury duty, etc.).

The lower pane 208 contains a single grid that summarizes a number of statistics in a temporally indexed fashion. The statistics include total contact volume, total number of hires, total head count, total staff hours, total cost, and total cumulative cost.

The left-most pane 202 contains folders of functionality, providing various tools within the folders. "Views" provides the ability to change views, selectively hiding and displaying arbitrary rows for all grids in the long-range planner. "Queues" provides the ability to edit Queue properties directly. "Profile" provides the ability to edit profile properties directly. "Wizards" provides the ability to launch Wizards that provide configuration support as well as intelligent advisors that guide the user through analytical best-practices in reducing contact center cost and increasing efficiency. "Events" provides the ability to annotate events and capture side effects of those events on contact center statistics.

Various functions of the long-range planner are implemented using various algorithms that will be described below. One function is an automated headcount and training forward calculator. The automated headcount and training forward calculator allows the user to instantly view the consequences of their hiring, training and transfer decisions on future head count. In one embodiment, the implementation is Java code that is triggered whenever the user makes changes to any of the following parameters of a long-range plan: the number of agents to be hired in a month; the attrition rate for one or more months; the number of agents that will transfer into or out of a profile; the initial headcount forecast going into the plan; and the amount of training time required to convert a newly hired or trained individual into a productive agent. When any such change is made, Java code carries forth a re-calculation of expected headcount throughout the rest of the plan for all affected profiles. This re-calculation is a mathematical formula involving summation based on all incoming agents to all profiles and subtraction based on all outgoing agents from all profiles. Training time is represented as a delay between the hiring of an agent and their addition to the effective head count.

The staff hours need calculator is another function. On a queue-by-queue and month-by-month basis, the staff hours need calculator computes the required number of staff hours in order to meet service level goals specified in the interface. This calculation has one further input: the distribution of contact volume over the course of an average day. The method described can be generalized to a greater or lesser resolution of distribution information including, for instance, distribution information for each week of a month and for each month in a year. The algorithm that computes staffing hours need begins with a calculation of the number of Erlangs required for each time interval in order to satisfy demand within predetermined service goals. The resolution of this Erlang need calculation is tied directly to the resolution with which distribution information has been specified.

Given required Erlangs for all time intervals, summation of these Erlangs yields an estimate of total Erlangs and therefore total staff hours required for the entire planned demand. A discount factor may be used to denote relaxation of demand when local demand peaks are sharp and, therefore, induce high inefficiency if the demand is to be met perfectly.

Figure 3:
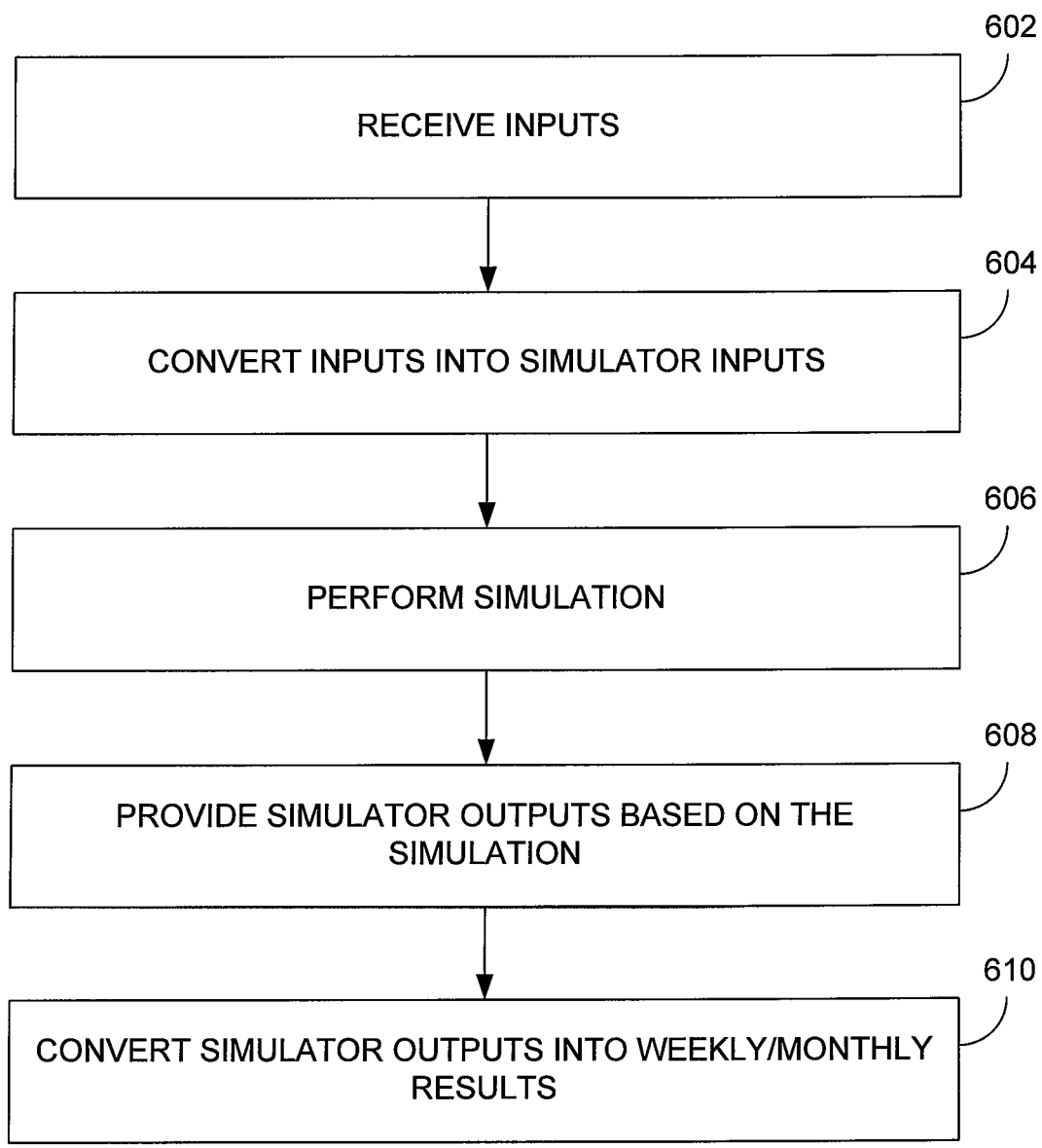
FIG. 3 is a flowchart depicting an embodiment of a method for performing discrete event based simulation.

Additionally or alternatively, long-range forecasting can be accomplished using discrete event based simulation to obtain the desired results. By way of example, an embodiment of a method for performing discrete event based simulation is depicted in FIG. 3. As shown in FIG. 3, the method may be construed as beginning at block 602, in which inputs are received. By way of example, the inputs can correspond to contact volume (in predetermined intervals), average handling time, hours of operation, holidays, number of hours contributed by each employee, initial head counts, service goal, and priorities. Notably, the user can input either weekly or monthly data. In block 604, these inputs are converted into simulator inputs usable by a simulator. By way of example, for each queue, the monthly/weekly contact volume and average handling time are converted to discrete contact arrival events. As another example, a discrete employee schedule is created using the current hiring plan and the monthly/weekly hours.

In block 606, the simulator inputs are provided to the simulator and simulation is performed. In some embodiments, the simulation can be performed in multiple iterations in order to improve the accuracy of the results obtained. In some embodiments, simulation is performed for every 15 minute interval. Then, in block 608, simulator outputs are provided. By way of example, the outputs obtained from the simulator (for every interval) are forecasted service level, forecasted hours, and percentage occupancy of the employees. The simulator outputs then can be converted to weekly or monthly results (block 610). Thus, the final outputs obtained in this embodiment are % Service level per queue per monthly or weekly, % Occupancy per profile per monthly or weekly, and forecasted FTE hours per monthly or weekly.

Each of the aforementioned steps will now be described in greater detail. In this regard, conversion of monthly/weekly contact volume and AHT to discrete contact arrivals events will now be described. The hourly contact distribution for each queue is obtained from the monthly/weekly call volume and the intraday contact distribution input values. Intraday contact distributions are different for "deferred" queues and "immediate" queues. For an immediate queue, the contact distribution is computed in the intervals in which the contact center is open while, for a deferred queue, the contact distribution is computed for the non-open intervals as well.

For determining hourly contact distribution (without holidays) for immediate queues, the hourly contact distribution is computed for each of the seven days of the week (i.e. for the 7*24=168 intervals). The input monthly/weekly contact volume is normalized by the intra-day and the intra-week contact distribution of that queue. These are the input parameters assigned to each queue. Based on these intra-day and intra-week contact distributions, the weight for each interval (intervals on which the contact center is open) is computed. Simply, weight is the proportion of the contacts that arrived at that interval. Hence, the contact distribution on each interval is obtained by multiplying the total contact volume and the weight at that interval as follows:

$$hourlyCV[time]=totalCV*weight[time]$$

where time=0, 1, 2 . . . is in hours.

From the hourly contact distribution, the 15 min interval distribution is obtained as follows:

e.g.: hourlyCV=13 contacts 15 min CV: 3, 3, 3 and 4 contacts.

For determining hourly contact distribution (with holidays) for immediate queues, holidays and holiday weights are obtained from the user. When there are holidays in the scenario, the contact distributions for the holiday interval are computed separately. That is, if there are n holidays, the number of hourly intervals is:

$$7*24+n*24$$

The number of contacts on a holiday interval is reduced by the holiday's weight. The remaining contacts are distributed among the rest of the intervals.

The computation of hourly contact distribution for the deferred queues differs from the computation of hourly contact distribution for the immediate queues. For deferred queues, the contacts are expected to arrive on all the intervals irrespective of whether the contact center is open or closed. The monthly/weekly contact volume is normalized by the intra-day and intra-week contact distribution. The contacts are distributed among all the 7*24 intervals corresponding to the seven days of the week.

For creating an initial schedule of the employees from the current hiring plan and the monthly/weekly working hours, the following employee parameters are provided to the simulator a) number of employees, b) initial schedule of the employees, and c) skills of the employees.

From the user, a set of profile information is obtained. The profile information obtained from the user includes: a) number of employees working per profile—hires per profile; b) list of queues that will be served by each profile—linked queues; c) priority for the queues that are linked to a profile (the default priority assigned is 1); and d) number of paid work hours per profile—hours per month/week. For example, the number of paid work hours for a weekly scenario is 40 hours per week.

The initial agents' schedule is obtained by computing the profile distribution (the available working hours per (hourly) interval) for each profile. This is obtained as follows:

a. The work load at each (hourly) interval is obtained: Work load=CV*AHT.

b. The agent hours required at each interval for the given work load is calculated using the Erlang C formulae. This gives the required working hours per interval.

c. The working hours per interval (for all employees) is given by,

Working hours[time]=Headcount per profile*staffing efficiency*required hours[time]

where for employees who work in a blended fashion (blended employees can accept contacts from any media at any time during their work):

Headcount per profile=Number of employees/profile for employees who work in a task switching fashion (task switching employees are employees who spend a scheduled portion of their time on immediate media and another portion of their time on deferred media:

Headcount per profile=Number of employees/profile*percentage time dedicated to this queue Table 1 shows an embodiment of a method to obtain the initial schedule of the employees and to obtain the total number of the employees.

TABLE 1

| | Interval | | | | | | | |
|---|---|---|---|---|---|---|---|---|
| | 0 | 1 | 2 | 3 | 4 | 5 | ... | n − 1 |
| Hours | 0 | 0 | 1.54 | 4.33 | 4.87 | x | ... | 0 |
| Hours* | 0 | 0 | 2 | 4 | 5 | x | ... | 0 |

TABLE 1-continued

| | Interval | | | | | | | |
|---|---|---|---|---|---|---|---|---|
| | 0 | 1 | 2 | 3 | 4 | 5 | ... | n − 1 |
| Loop 0 | 0 | 0 | 2 | 4 | 5 | x | ... | 0 |
| Schedule [0] 0 | 0 | 1 | 1 | 1 | 1 | x − 1 | ... | 0 |
| Employee count | 1 | | | | | | | |
| Loop 1 | 0 | 0 | 1 | 3 | 4 | x − 1 | ... | |
| Schedule [1] 0 | 0 | 1 | 1 | 1 | 1 | ... | | 0 |
| Employee count | 2 | | | | | | | |
| Loop 2 | 0 | 0 | 0 | 2 | 3 | x − 2 | ... | 0 |
| Loop n − 1 0 | 0 | 0 | 0 | 0 | 1 | ... | | 0 |
| Schedule [n − 1] | 0 | 0 | 0 | 0 | 0 | 1 | ... | 0 |
| Employee count | n | | | | | | | |

The procedure depicted in Table 1 is repeated for each profile. The total number of employees is the sum of the number of employees from each profile. The skills for the employees are assigned based on the queues that are served by the corresponding profile. Finally, from the hourly schedule, the initial schedule for the 15 minute intervals is obtained.

When the state of the system changes on discrete time intervals, it is called discrete event. Simulating such transitions is called discrete event based simulation. The random nature of the contact arrival and contact handling events in a contact center scenario makes discrete event based simulation suitable for the contact center applications. In this application, the random contact arrival events, contact handling events and agent assignments are generated in 15 minute intervals. The agents are assigned randomly to different queues based on the skills that are provided as input data to the simulator. This simulation process is repeated for each interval (eg: (7+n)*24*4 intervals, where n=0, 1, 2 ... ). Also, simulation is performed several times in order to improve the accuracy of the results obtained. For each interval, the final output such as percentage contacts answered (peA), forecasted FTE hours, occupied and unoccupied seconds (i.e., the amount of time that each agent spends on contacts and the amount of time that each agent spends idle) of the employees are stored. These results are manipulated further to obtain the final results such as service level, forecasted FTE hours and occupancy per period.

The results obtained from the simulator correspond to each of the intervals. These results are manipulated to obtain the output such as forecasted service level per queue, forecasted FTE hours per queue, and percentage occupancy per profile. These results are calculated per week or per month depending on the scenario.

In obtaining forecasted service level per queue per period, the percentage service level determines the service level that can be achieved with the current work load and employee assignments. The percentage contacts answered (peA) value can be obtained from the simulator for each interval. The forecasted service level is then calculated using the following formulae:

$$totalPCA[queue] = \sum_{i=0}^{i=N}(CV[queue][i]*\text{number of copies of } i \text{ per period}*$$

$$\text{percentage calls answered}[queue][i])$$

where N=7*24*4 intervals for deferred queues and immediate queues without holidays
N=(7+n)*24*4 intervals for non-deferred queues with n holidays $$averagePCA[queue] = \sum_{i=0}^{i=N}(CV[queue][i] * \text{number of copies of } i \text{ per period})$$

$$\% ServiceLevel[queue] = (totalPCA[queue] / averagePCA[queue]) * 100$$

where number of copies of i (interval) per period is the number of times the corresponding day of week occurs in a month. For a weekly scenario, the number of occurrence of any day of week is 1. When there are holidays in a month or a week, the number of copies of the interval is reduced by the number of holidays available in that month/week.

In obtaining forecasted FTE hours per queue per period, the forecasted FTE hours are the number of hours that would be contributed to the queue with the current set of profiles. The forecasted FTE hours is calculated by:

Case 1: When PCA [queue] [interval]=0

FTE[queue][interval]=AgentSeconds[queue][interval]/(15*60) where AgentSeconds is the number of seconds spent on this 'queue' in this 'interval.'

Case 2: When PCA [queue] [interval]=100

FTE[queue][interval=reverseErlang(with service goal=99]+(AgentUnoccupiedSeconds[queue][interval]/15*60)

where reverseErlang–the required agents is identified for the given contact volume, ART and Service goal is set as 99
AgentUnoccupiedSeconds is the number of idle seconds.

Case 3: When 0<PCA<100

FTE[queue][interval]=reverseErlang (with service level=PCA[queue][interval])

The forecasted FTE hours per hour is calculated by taking the average of the forecasted FTE hours/15 min intervals obtained from the simulator for that hour. The hourly forecasted FTE hours per each queue is then summed to get the total forecasted FTE hours per queue for that period.

In obtaining percentage occupancy per profile, the occupied seconds for each interval is obtained from the simulator. This is the total sum of the occupied seconds of all the employees scheduled in an interval. The occupied seconds per profile per period can then be calculated as follows:

$$totalOccupancy[profile] = \sum_{i=0}^{i=N}\begin{pmatrix} Headcount[profile][i] \\ * \text{number of copies of } i \text{ per period} \\ * Occupancy[profile][i] \end{pmatrix}$$

$$totalOccupancy[profile] = \sum_{i=0}^{i=N}\begin{pmatrix} Headcount[profile][i] \\ * \text{number of copies of } i \text{ per period} \end{pmatrix}$$

where N=7*24*4 intervals for deferred queues and non-deferred queues without holidays
N=(7+n)*24*4 intervals for non-deferred queues with n holidays % Occupancy[profile]=(totalOccupancy[profile] layerageOccupancy profile)*100 where, number of copies of i (interval) per period is the number of times the corresponding day of week occurs in a month. For a weekly scenario, the number of occurrence of any day of week is 1. When there are holidays on the month or week, the number of copies of the interval is reduced by the number of holidays assigned in the month/week.

Figure 4:
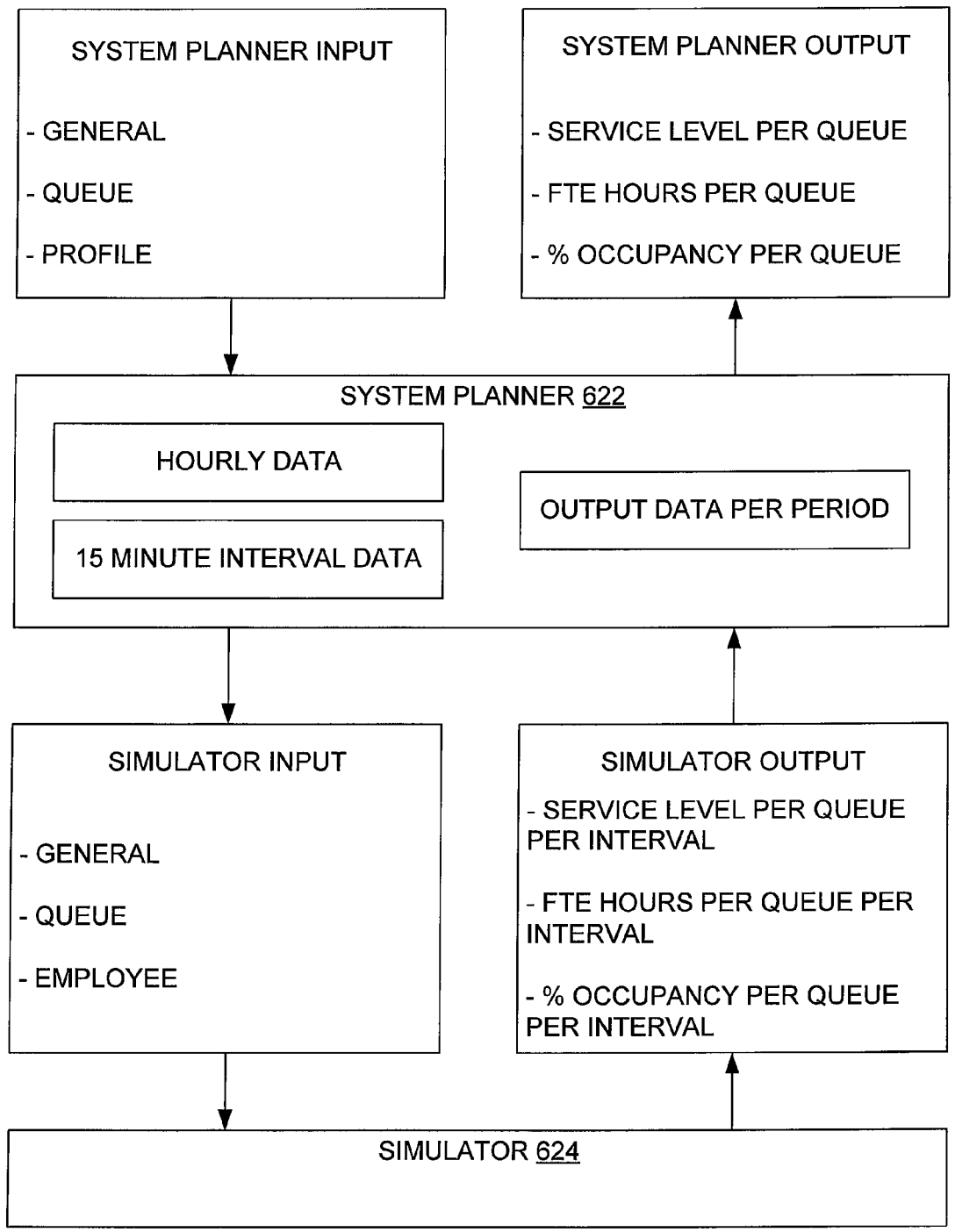
FIG. 4 is a schematic diagram of an embodiment of a system that can be used for performing discrete event based simulation.

In this regard, FIG. 4 is a schematic diagram of an embodiment of a system that can be used for performing discrete event based simulation as described above. As shown in FIG. 4, system 620 incorporates a system planner 622 and a simulator 624. It should be noted that the structures and/or functions associated with each of the system planner and simulator can be provided by a system such as depicted in FIG. 1. That is, each can be one or more computers that may exhibit a distributed architecture and/or otherwise can communicate with other components for performing various tasks.

In the embodiment of FIG. 4, system planner 622 receives various inputs, such as general inputs, queue inputs and profile inputs. The general inputs can include hours of operation, intra-day distribution, intra-week distribution and holidays. The queue inputs can include monthly/weekly contact volume and average handling time. The profile inputs can include monthly/weekly agent hires and FTE hours.

Responsive to receiving the inputs, the system planner generates data for predetermined time intervals. By way of example, the system planner can use the inputs to generate hourly data such as hourly contact distribution, average handling time, hourly profile distribution and head count per profile. The system planner can then use this hourly data to generate more refined data, such as data corresponding to each 15 minutes interval. In this case, the data for each 15 minute interval includes contact distribution, average handling time, and initial schedule of the employees.

Data generated by the system planner is then provided as inputs to the simulator. For instance, simulator inputs can include general inputs, queue inputs and employee inputs. The general inputs can include number of queues, number of employees and number of intervals. The queue inputs can include queue identification, queue type, contact volume per interval, average handling time per interval, goal percent and goal seconds. The employee inputs can include employee identification, initial schedules, employee skills and priorities.

Responsive to the simulator inputs, the simulator 624 performs simulation for each interval to generate simulator outputs. The simulator outputs can include service level per queue per interval, forecasted hours per queue per interval and occupancy per employee per interval.

The system planner can then analyze the simulator output and can provide system outputs. The system outputs can include forecasted service level per queue, forecasted FTE hours per queue and percent occupancy per queue.

Method and apparatuses for long-range planning have been described with reference to particular embodiments and examples. Various modifications in approach and application are possible without departing from the spirit and scope of the invention, which is defined by the claims.

The invention claimed is:

1. A method for performing long-range staff planning in a contact center, the method comprising:
defining a plurality of resource descriptions, wherein each resource description comprises a group of agents that have similar characteristics including at least one capability, at least one performance measure, and at least one attribute specifying an amount of change in a number of agents in the group of agents during a specified time period;

defining a time interval and a plurality of queues comprising contact volumes;

specifying at least one criteria to be satisfied by a long-range staffing plan, wherein the criteria comprises a required quality of service for each queue of the plurality of queues and the long-range staffing plan comprises a long-range schedule for the plurality of resource descriptions;

processing the plurality of resource descriptions and the contact volumes to identify required agent hours and staffing efficiency at each time interval, and multiplying the required agent hours at each time interval by the staffing efficiency at each time interval and number of agents in each group of agents to determine available working hours at each time interval for each resource description; and calculating an effect of applying the plurality of resource descriptions to each of the plurality of queues while satisfying the at least one criteria using discrete event based simulation on a computer system, wherein the calculated effect comprises two or more of forecasted service level, forecasted hours, and percentage occupancy of the agent, and includes a forecasted performance measure for each of the plurality of queues for each time interval and an overall performance measure for each of the plurality of queues, and in calculating the effect, a discrete schedule is created using a current hiring plan for one or more of the each group of agents and hours available to be worked by the one or more of the each group of agents during a time corresponding to the discrete schedule, and an agent is alternatively assigned to one or more of the available working hours at each time interval to calculate an incremental effect of adding the agent such that the agent is the only agent being added until the available working hours at each time interval are distributed.

2. The method of claim 1, wherein
at least one of the groups of agents corresponds to employees.

3. The method of claim 2, further comprising converting the forecasted service level, forecasted hours, and percentage occupancy of the employees into a percentage service level per queue per monthly or weekly, a percentage occupancy per profile per monthly or weekly, and forecasted full-time employee hours per monthly or weekly.

4. The method of claim 1, wherein, in calculating the effect, the simulation is performed in multiple iterations.

5. The method of claim 2, wherein at least one of the plurality of resource descriptions includes an employee profile, and wherein the at least one capability includes a skill set.

6. The method of claim 5, wherein the at least one performance measure includes an efficiency percentage indicating the staffing efficiency, and wherein applying the plurality of resource descriptions to the plurality of queues includes staffing at least one queue with the at least one employee profile.

7. The method of claim 6, wherein the calculated effect further includes a queue occupancy for each queue, and an estimated cost of the long-range staffing plan.

8. The method of claim 6, wherein the characteristics further include:
shrinkage, wherein shrinkage comprises various categories of time for which an employee is paid, but during which the employee does not work; burden, wherein burden comprises various categories of expenses associated with the employee, including benefit expenses; and wage.

9. The method of claim 6, wherein specifying characteristics further comprises specifying whether a profile may be hired into, and a time period required to bring an employee hired into the profile to a predefined level of efficiency.

10. The method of claim 6, further comprising displaying the calculated effect of the long-rang staffing plan, comprising displaying for each queue of the at least one queue for each of a plurality of predefined time periods: a contact volume; a predefined average handling time goal; an actual service level; and a required service level.

* * * * *